US012663515B2

(12) United States Patent
Meyer et al.

(10) Patent No.: US 12,663,515 B2
(45) Date of Patent: Jun. 23, 2026

(54) THERMOPLASTIC COMPOSITION FOR LiDAR SENSOR SYSTEM WITH IMPROVED ABSORPTION PROPERTIES

(71) Applicant: Covestro Deutschland AG, Leverkusen (DE)

(72) Inventors: Alexander Meyer, Düsseldorf (DE); Peter Capellen, Krefeld (DE); Rafael Oser, Krefeld (DE); Rainer Hagen, Leverkusen (DE); Christoph Klinkenberg, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 1074 days.

(21) Appl. No.: 17/775,928

(22) PCT Filed: Nov. 9, 2020

(86) PCT No.: PCT/EP2020/081482

§ 371 (c)(1),
(2) Date: May 11, 2022

(87) PCT Pub. No.: WO2021/094248

PCT Pub. Date: May 20, 2021

(65) Prior Publication Data

US 2023/0003839 A1 Jan. 5, 2023

(30) Foreign Application Priority Data

Nov. 14, 2019 (EP) .................................... 19209080

(51) Int. Cl.

| | |
|---|---|
| ***G01C 3/08*** | (2006.01) |
| ***C08K 5/00*** | (2006.01) |
| ***C08K 5/18*** | (2006.01) |
| ***C08K 5/3432*** | (2006.01) |
| ***C08K 5/3465*** | (2006.01) |
| ***C08L 33/12*** | (2006.01) |
| ***C08L 69/00*** | (2006.01) |
| ***G01S 7/481*** | (2006.01) |
| ***G01S 17/931*** | (2020.01) |
| ***G02B 5/00*** | (2006.01) |

(52) U.S. Cl.

CPC .......... *G01S 7/4811* (2013.01); *C08K 5/0041* (2013.01); *C08K 5/18* (2013.01); *C08K 5/3432* (2013.01); *C08K 5/3465* (2013.01); *C08L 33/12* (2013.01); *C08L 69/00* (2013.01); *G01S 7/4814* (2013.01); *G01S 17/931* (2020.01); *G02B 5/003* (2013.01)

(58) Field of Classification Search

CPC .... G01S 7/4814; G01S 7/4811; G01S 17/931; C08K 5/0041; C08K 5/18; C08K 5/3465; C08L 33/12; C08L 69/00; G02B 5/003

See application file for complete search history.

(56) References Cited

U.S. PATENT DOCUMENTS

| | | | | |
|---|---|---|---|---|
| 3,707,397 | A | 12/1972 | Gagnon | |
| 4,185,009 | A | 1/1980 | Frietag et al. | |
| 4,278,804 | A | 7/1981 | Ashby et al. | |
| 4,373,061 | A | 2/1983 | Ching | |
| 4,410,594 | A | 10/1983 | Olson | |
| 5,041,313 | A | 8/1991 | Patel | |
| 5,367,044 | A | 11/1994 | Rosenquist | |
| 5,391,795 | A | 2/1995 | Pickett | |
| 5,679,820 | A | 10/1997 | Pickett et al. | |
| 5,712,325 | A | 1/1998 | Lewis et al. | |
| 5,817,715 | A | 10/1998 | Medford | |
| 5,990,188 | A | 11/1999 | Patel et al. | |
| 6,228,973 | B1 | 5/2001 | McCloskey et al. | |
| 2012/0287417 | A1 | 11/2012 | Mimeault | |
| 2020/0377692 | A1* | 12/2020 | Grosser | C08L 69/00 |

FOREIGN PATENT DOCUMENTS

| | | | | |
|---|---|---|---|---|
| DE | 1031512 | B | 6/1958 | |
| DE | 2500092 | A1 | 7/1976 | |
| DE | 4240313 | A1 | 6/1994 | |
| DE | 19943642 | A1 | 3/2001 | |
| DE | 10057165 | A1 | 5/2002 | |
| DE | 69717959 | T2 | 9/2003 | |
| EP | 0087001 | A1 | 8/1983 | |
| EP | 0517044 | A2 | 12/1992 | |
| EP | 1506249 | A1 | 2/2005 | |
| EP | 1582549 | A1 | 10/2005 | |
| EP | 3395875 | A1 * | 10/2018 | C08K 5/0041 |
| GB | 1476108 | A | 6/1977 | |
| JP | 2008-009222 | A | 1/2008 | |
| JP | 2008009238 | A * | 1/2008 | G02B 5/22 |
| JP | 6354888 | B2 | 7/2018 | |
| WO | 02/26862 | A1 | 4/2002 | |
| WO | 03/95521 | A1 | 11/2003 | |
| WO | 2005/113639 | A1 | 12/2005 | |
| WO | 2007/135032 | A2 | 11/2007 | |

(Continued)

OTHER PUBLICATIONS

International Search Report and Written Opinion received for PCT Patent Application No. PCT/EP2020/081482, mailed on Jan. 28, 2021, 11 pages (2 pages of English Translation and 9 pages of Original Document).

*Primary Examiner* — Mark Hellner

(74) *Attorney, Agent, or Firm* — John E. Mrozinski, Jr.; Richard P. Bender

(57) ABSTRACT

A sensor system comprises a LiDAR unit having an emitter for laser light having a wavelength of 900 nm to 1600 nm and a receiver for light over a wavelength range which is between 800 nm and 1600 nm and at least partly below the operating wavelength of the LiDAR sensor and a cover having a substrate layer made of thermoplastic material which is arranged such that IR light emitted by the LiDAR unit and received by the LiDAR unit passes through the cover.

13 Claims, No Drawings

(56) References Cited

FOREIGN PATENT DOCUMENTS

| | | | |
|---|---|---|---|
| WO | 2008/037364 | A1 | 4/2008 |
| WO | 2014/100300 | A1 | 6/2014 |
| WO | 2018/197398 | A1 | 11/2018 |
| WO | 2019/121347 | A1 | 6/2019 |

* cited by examiner

THERMOPLASTIC COMPOSITION FOR LiDAR SENSOR SYSTEM WITH IMPROVED ABSORPTION PROPERTIES

CROSS-REFERENCE TO RELATED APPLICATIONS

This application is a national stage application (under 35 U.S.C. § 371) of PCT/EP2020/081482, filed Nov. 9, 2020, which claims benefit of European Application No. 19209080.1, filed Nov. 14, 2019, both of which are incorporated herein by reference in their entirety.

The invention relates to a sensor system comprising a LiDAR unit having an emitter for laser light having an operating wavelength of 900 nm to 1600 nm and a receiver for laser light over a wavelength range which is between 800 nm and 1600 nm (inclusive) and at least partly below the operating wavelength of the LiDAR sensor and a cover having a substrate layer comprising a region made of a thermoplastic composition based on polycarbonate and/or polymethyl methacrylate which is arranged such that IR light emitted by the LiDAR unit and received by the LiDAR unit passes through the region made of the thermoplastic composition.

Driver assistance systems such as emergency brake assistants, lane assistance systems, traffic sign recognition systems, adaptive speed control systems and distance controllers are known and are employed in current vehicles. To implement the recited functions, surroundings detection sensors generally based on radar, LiDAR, ultrasound and camera sensors are employed. LiDAR sensors are important in particular for highly automated and autonomous driving, since they are capable of providing high-resolution three-dimensional images of the vehicle surroundings at from close to distant range.

LiDAR (short for light detection and ranging) or else LaDAR (laser detection and ranging) is a method for optical distance and velocity measurement based on infrared laser beams. Very different types of LiDAR systems are in existence and differ inter alia in terms of their horizontal detection range (for example 70° up to 360°), light source type (for example continuous wave laser, pulsed laser or light emitting diode (LED)) and sensor technology (for example mechanically rotating mirror or digital micromirrors).

LiDAR sensors are already used in the field of vehicle sensors today. One great advantage of these optical sensors is that they record a very precise three-dimensional image of the environment which they can save as a point cloud image. It is possible to employ one LiDAR sensor or two or more LiDAR sensors in a motor vehicle.

LiDAR sensors typically have a cover in the region of the sensor field of view.

Thermoplastic material may be employed as the base material for a LiDAR sensor cover. Component parts based on thermoplastic material offer many advantages over conventional materials such as for example glass for use in the automotive sector. These include for example elevated fracture resistance and/or weight reduction which in the case of automobiles allow greater occupant safety in road traffic accidents and lower fuel consumption. Finally, materials containing thermoplastic polymers allow substantially greater freedom in design on account of their easier mouldability.

The purpose of a cover made from a thermoplastic material is to conceal the LiDAR sensor and also to protect the sensitive sensor electronics.

It is especially relevant for the LiDAR sensor function for the cover to function as an optical layer having very specific transmission characteristics in the range of the operating wavelengths and detection wavelengths of the sensor. A high-quality optical cover makes it possible to achieve for example a high sensor reach and high data quality/image quality. US 2012/0287417 A1 describes this rationale for selection of suitable spectral filters in the field of view of the sensor: A suitable spectral filter is characterized in that it is transparent in the emission spectrum of the LiDAR sensor and simultaneously not transparent for ambient light, i.e. incident stray light, outside this emission spectrum.

LiDAR sensors and the use of the polycarbonate Makrolon 2405 with the colour formulation 450601 are described in US 2012/0287417 A1. Such a composition contains only colorants such as are hereinbelow defined as colorants of group a. Further polycarbonate applications or compositions relating to LiDAR sensors are described in WO 2018/197398 A1. It has been found that the signal from the LiDAR sensor is disrupted by extraneous light when using such materials.

It has been found that a wavelength range of electromagnetic radiation that is particularly critical for LiDAR sensors is between 700 and <900 nm. The receivers of many LiDARs—the so-called photodetectors—still have sufficient sensitivity in this range for electromagnetic radiation of these wavelengths to generate measured signals. There is simultaneously a great deal of ambient light in this wavelength range which derives from natural or artificial light and can reach the photodetector as stray light. Examples of stray light sources are the sun, road lighting at night, light from the headlights of other traffic or backscattered light from the headlights of one's own vehicle. This generates spurious signals in the sensor which mask the actual measured signals. Possible consequences include deterioration of the signal-to-noise ratio or disruption of distance measurements or even damage to the hardware of the receiver. Since the cover does not ensure complete absorption of the light it is possible for stray light to penetrate through the cover and reach the receiving unit and for the LiDAR sensor to be disrupted or damaged as described by extraneous light of these wavelengths.

It has especially been found that commonly used LiDAR sensors whose operating wavelength is 900 to 980 nm, for example 905 nm, but whose receiver registers light in a broader wavelength range, especially also below the operating wavelength of the LiDAR sensor, are disrupted by any extraneous light, but in particular light which has a wavelength of 700 to <900 nm and does not derive from the LiDAR emitter. For such LiDAR sensors the requirements of the transmission characteristics of the covers are particularly demanding since the highly transparent and non-transparent wavelength ranges are adjacent. The same also applies to LiDAR sensors having their operating wavelengths in higher wavelength ranges. For these too, extraneous light having a wavelength of 700 to <900 nm is particularly disruptive.

In order to block this disruptive light and to protect the LiDAR sensor from extraneous light it is desirable to achieve the highest possible absorption in the range from 700 to <900 nm. However this is beset by a great many problems. Since the colorants never exhibit very sharp absorption lines but rather absorption bands extending over a particular wavelength range, entirely vertical absorption flanks that simply filter out the desired light range are not possible. Only very few colorants from the group of all colorants are suitable for polycarbonate or polymethyl methacrylate. A colorant must have an appropriate and sufficient heat stability for the compounding process and for the moulding process. Good incorporability must also be present. Furthermore, the fact that a colorant is in principle suitable for polycarbonate or polymethylmethacrylate does not allow conclusions to be drawn as to its suitability for LiDAR applications. A further problem is that many colorants are not stable, i.e. exhibit inadequate lightfastness. However, for the present objective it is especially important that the absorption properties in the range from 700 to <900 nm do not change. One fundamental problem is that most commonly used colorants for LiDAR-capable thermoplastic substrate materials, i.e. especially polycarbonate and polymethylmethacrylate, only exhibit relevant absorptions between 400 and 650 nm Japanese patent JP 6354888 B2 describes a multilayer article made of polycarbonate for an IR sensor system containing a certain colorant mixture. The following colorants are described: a first type of colorant from the group of quinoline dyes which absorb in the wavelength range 300 to 550 nm, a second type from the group of anthraquinones dyes which absorb between 450 and 800 nm, a third type of dye from the group of perinones which absorb between 400 and 800 nm and a fourth type from the group of triazines, actually UV absorbers, which absorb between 100 and 400 nm. This application thus describes a multiplicity of colorants but the decisive colorants of colorant group b as defined hereinbelow which have an absorption maximum in the range from 650 to 850 nm are not mentioned. A person skilled in the art thus cannot in practice develop LiDAR-capable substrates showing cutoff bands shifted to higher wavelengths. The cutoff band is the long-wavelength flank in the absorption band of the colorant mixture characterized by an absorption maximum followed by a fall in absorption with increasing wavelength and an absorption minimum. The application further describes a single transmission measurement to demonstrate the suitability of the colorant mixture for IR-assisted sensors. However, a single transmission measurement does not make it possible to draw any conclusions about the suitability of corresponding compositions for LiDAR systems. Colorant mixtures forming part of the subject matter of the present invention are not described in JP 6354888 B2.

JP 2008009222 A and JP 2008009238 A likewise describe colorant mixtures for sensor systems. However, LiDAR systems are not described. The colorant mixtures are suitable for polycarbonate. The colorant mixtures contain colorants unsuitable for LiDAR systems. Concentration ranges unsuitable for LiDAR systems are also mentioned. Also required for these colorant mixtures are phosphorus-based stabilizers which are not required for the colorant mixtures disclosed herein.

The cover systems behind which the LiDAR units are located are in most cases nontransparent, i.e. opaque/black-coloured, i.e. the corresponding substrate materials are absorbent over the entire visible spectral range, i.e. in the range between about 380 and 780 nm, and in this range have a transmission Ty of <0.5% determined according to DIN EN ISO 13468-2:2006 at a layer thickness of 4 mm. Since many LiDAR systems operate in the range from 900 nm to 980 nm, i.e. emit signals in this range, for example at an operating wavelength of 905 nm, it is necessary for the corresponding thermoplastic substrate to have a high transmission at 900 nm, ideally higher than 85%, preferably higher than 86% and especially preferably higher than 88%, determined according to DIN EN ISO 13468-2:2006 at a layer thickness of 4 mm. However it must be noted here that the transmission measurement alone gives no indication of whether a material is suitable for LiDAR sensors. Nevertheless, a high transmission at the wavelength at which the LiDAR sensor operates is indispensable.

A person skilled in the art thus cannot, as a whole, derive from the prior art which colorant-containing thermoplastic compositions having particularly good absorption characteristics are suitable for LiDAR systems.

The present invention accordingly has for its object to provide a thermoplastic composition for the cover of a LiDAR sensor system whose substrate layer/part of the substrate layer through which the LiDAR signal passes exhibits a low attenuation of the LiDAR signal but wherein extraneous light in the wavelength range between 700 and <900 nm which is disruptive to the signal is masked out, i.e. the colorant mixture must have a relevant absorption of 700 to <900 nm, without significantly affecting the LiDAR range at 900 nm to 1600 nm. The cover should moreover give a black opaque impression. The transmission Ty should be <0.5%, preferably <0.1%, determined according to DIN EN ISO 13468-2:2006 at a layer thickness of 4 mm.

The object is surprisingly achieved by a sensor system comprising a LiDAR unit having an emitter for laser light having an operating wavelength of 900 nm to 1600 nm, preferably 900 to 980 nm, and a receiver for laser light over a wavelength range which is between 800 nm and 1600 nm and is at least partially below the operating wavelength of the LiDAR sensor and a cover having a substrate layer comprising a region made of a thermoplastic composition based on aromatic polycarbonate and/or polymethyl methacrylate which is arranged such that the IR light emitted by the LiDAR emitter and received by the LiDAR receiver passes through the region made of the thermoplastic composition, wherein the thermoplastic composition has a light transmission Ty determined according to DIN EN ISO 13468-2:2006 at a layer thickness of 4 mm of <0.5%, characterized in that the thermoplastic composition contains a) at least two colorants having an absorption maximum in the range from 400 nm to 650 nm selected from the group consisting of anthraquinone and perinone dyes in a total concentration of 0.07% by weight to 0.5% by weight and b) at least one colorant having an absorption maximum in the range from >650 nm to 800 nm selected from the group consisting of the colorants of formulae (1) to (5) with (1)

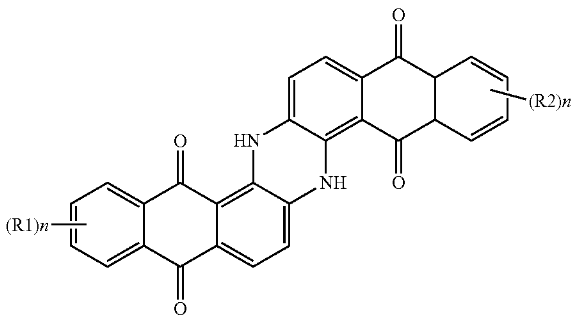

in a concentration of 0.008% to 0.02% by weight, wherein

R1 and R2 independently of one another represent a linear or branched alkyl radical or halogen, n is a natural number between 0 and 4, (2)

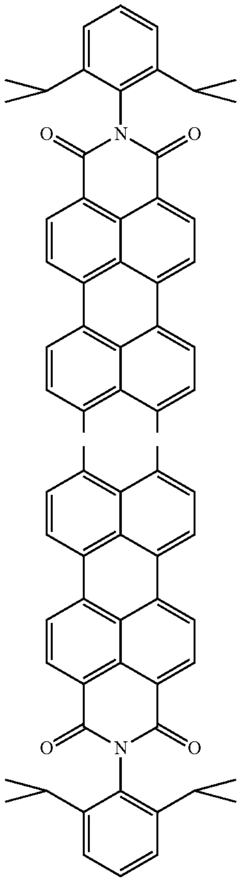

in a concentration of 0.002% to 0.008% by weight, (3)

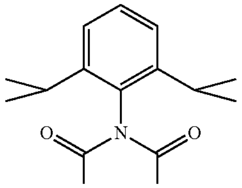

-continued

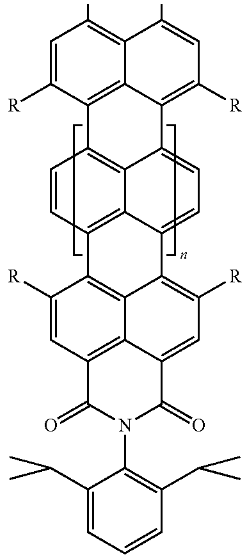

where

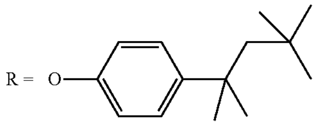

and n=1 to 3 in a concentration of 0.002% to 0.008% by weight, wherein the total concentration of colorants of formulae (2) and (3) is up to 0.008% by weight, wherein "up to" is to be understood as meaning "not more than", (4)

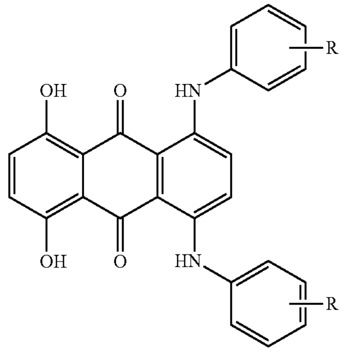

in a concentration of 0.04% to 0.3% by weight where R=n-butyl, iso-butyl, (5)

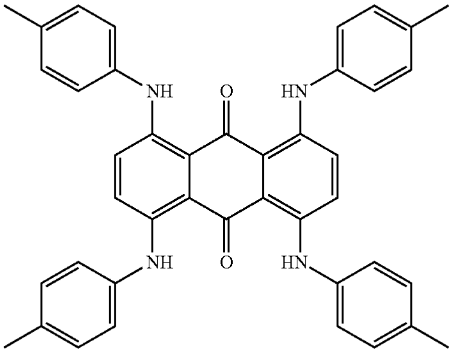

in a concentration of 0.04% to 0.3% by weight, in a total concentration of 0.005% to 0.3% by weight and wherein the composition contains <0.05% by weight of phthalocyanines and is preferably free from phthalocyanines.

The total concentration of 0.005% to 0.3% by weight relates to the colorants of group b.

Group a of the polycarbonate matrix- or PMMA matrix-soluble colorants having an absorption maximum in the range from 400 to 650 nm to be employed according to the invention are anthraquinone dyes and/or perinone dyes. Corresponding dyes are preferably selected from the group consisting of Macrolex Yellow 3G having CAS number 4702-90-3, Macrolex Yellow 6G having CAS number 80748-21-6, Macrolex Orange 3G (CAS number 6925-69-5, C.I. 564100), Oracet Yellow 180 having CAS number 13676-91-0, Solvent Orange 116 having CAS number 669005-94-1, Pigment Yellow having CAS number 30125-47-4, Macrolex Red 5B (Solvent Red 52; C.I. 68210) having CAS number 81-39-0, Macrolex Red EG having CAS number 71902-17-5, Macrolex Red E2G having CAS number 89106-94-5, Macrolex Violet 3R (CAS 61951-89-1, Solvent Violet 36, Color Index number 61102), Macrolex Red Violet R (Disperse Violet 31, Disperse Violet 26, C.I. 62025) having CAS number 12217-95-7, Macrolex Violet B having CAS number 81-48-1, Amaplast Violet PK, Macrolex Blue RR (Solvent Blue 97) having CAS number 61969-44-6, Macrolex Blue 3R having CAS number 41611-76-1, Solvent Blue 132 having CAS number 110157-96-5, Keyplast Blue KR having CAS number 116-75-6 and/or Macrolex Green 5B having CAS number 128-80-3. One requirement of colorants of group a is that they are soluble in aromatic polycarbonates/polymethylmethacrylate and are not destroyed at a processing temperature of the polymer, for example at 300° C.

Two or more of these colorants are combined so as to give a black colour impression.

According to the present invention black compositions are to be understood as meaning compositions described by the CIELab color coordinates L* less than 40, a* less than 15 and more than −15, preferably less than 10 and more than −10, and b* less than 15 or more than −15, preferably less than 10 and more than −10, determined at a thickness of 2 mm according to ISO 13468-2:2006 (D65, 10°) and measured in transmission. According to the present invention grey compositions are to be understood as meaning compositions described by the CIELab colour coordinates L* of at least 40 and less than 65, a* less than 15 and more than −15, preferably less than 10 and more than −10, and b* less than 15 or more than −15, preferably less than 10 and more than −10, determined at a thickness of 2 mm according to ISO 13468-2:2006 (D65, 10°) and measured in transmission.

The total concentration of colorants of group a is at least 0.07% by weight, more preferably at least 0.13% by weight, yet more preferably 0.15% by weight, particularly preferably at least 0.18% by weight. Not more than 0.5% by weight, preferably up to 0.4% by weight, more preferably up to 0.3% by weight and especially preferably up to 0.25% by weight of these colorants are employed. Excessive amounts of colorants of group a have adverse effects, for example result in formation of mould deposits, impair the mechanical properties and/or attenuate the LiDAR signal.

As a result of the described configuration the cover appears black to the observer and electronic elements such as sensors or cameras located behind it are hardly perceived, if at all. This is known as the "black panel" effect and allows the automotive designer greater freedom in the design of aesthetically pleasing automotive exteriors and interiors.

Colorants of group b having an absorption maximum of >650 nm to 800 nm are described hereinabove. Here, as in other places where numerical ranges are recited, the term "up to" also includes the recited numerical value as the upper limit. It has surprisingly been found that the LiDAR sensor performs better when using these colorants since disruptive extraneous light which otherwise has adverse effects on the LiDAR sensor is blocked. For colorants of formula (1) where n=0 to 4 the following is preferred:

(1)

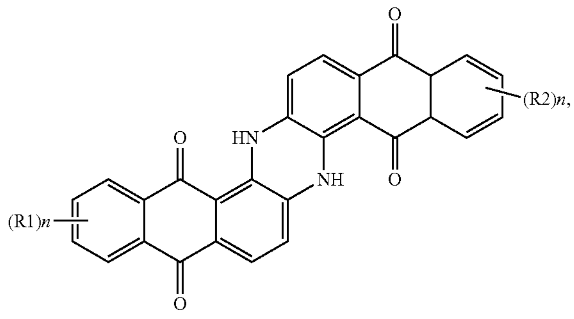

wherein

R1 and R2 independently of one another represent methyl, ethyl, propyl, isopropyl, butyl, isobutyl, tert-butyl, pentyl, neopentyl, hexyl, thexyl or Cl, more preferably methyl, Cl and especially preferably Cl.

It is very particularly preferable when n=0 in all rings, so that all R1 and R2=H.

Colorants of this structure (1) are commercially available under the Paliogen Blue series from BASF SE, Ludwigshafen, Germany.

When using colourants of structure (1) preference is given especially to pigments having a bulk volume determined according to DIN ISO 787-11:1995-10 of 2 l/kg-10 l/kg, more preferably 3 l/kg-8 l/kg, a specific surface area determined according to DIN 66132:1975-07 of 5 $m^2/g$-60 $m^2/g$, further preferably 10 $m^2/g$-55 $m^2/g$, and a pH determined according to DIN ISO 787-9 of 4-9.

According to the invention these colorants are employed in a concentration between 0.008% and 0.02% by weight.

The colorants of formula (2) are commercially available as Lumogen IR 765 from BASF SE, Ludwigshafen, Germany. Colorants of formula (2) are preferably employed in a concentration of 0.002% to 0.008% by weight, more preferably 0.003% to 0.008% by weight, in particular up to 0.0080% by weight.

For colorants of formula (3) it is preferable when n=2. Colorants of formula (3) are commercially available as Lumogen IR 788 from BASF SE, Ludwigshafen, Germany. Colorants of formula (3) are preferably employed in a concentration of 0.002% to 0.008% by weight, more preferably 0.003% to 0.008% by weight, in particular up to 0.0080% by weight. When colorants of formulae (2) and (3) are employed in combination their total concentration is not more than 0.008% by weight.

Colorants of formula (4) where R=n-butyl, iso-butyl are known under the trade name Macrolex Green G (Solvent Green 28) and obtainable for example from Lanxess Deutschland GmbH.

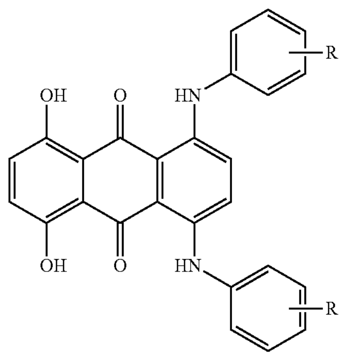

Colorants of formula (4) are employed according to the invention in a total concentration of 0.04% to 0.3% by weight, preferably 0.05% to 0.2% by weight.

Colorants of structure (5) are known under CAS number 108313-14-0. Colorants of formula (5) are employed according to the invention in a total concentration of 0.04% to 0.3% by weight, preferably 0.05% to 0.2% by weight.

Colorants of group b are employed in a total concentration up to 0.3% by weight, preferably up to 0.2% by weight, more preferably up to 0.05% by weight, yet more preferably up to 0.02% by weight, particularly preferably up to 0.008% by weight.

It has surprisingly been found that only the colorants of formulae (1) to (5) having an absorption maximum in the range from >650 nm to 800 nm, but not phthalocyanines for example, do not attenuate the LiDAR signal too severely. This was not foreseeable. Colorants exhibit absorption curves and there are thus also marked absorptions at wavelengths adjacent to the absorption maximum. No colorant has a vertical absorption band. Colorants typically employed in polycarbonate or polymethyl methacrylate exhibit very broad absorption curves.

The compositions preferably contain no colorants other than the colorants of groups a and b.

In a preferred embodiment the composition of colorants of group b contains only colorants of formula (2) and/or (3). It is particularly preferable when the only colorant of group b present is colorant (2). Not more than 0.008% by weight of colorant b are then employed. It will be appreciated that all embodiments otherwise referred to as "preferred", "more preferred", "particularly preferred", "very particularly preferred" which relate to other features of the subject matter according to the invention may be combined with this embodiment provided they are not in conflict therewith.

"Cover" or "use for covering" is to be understood as meaning according to the invention that the cover made of or comprising the subregion made of the described thermoplastic composition is used to be placed in front of the LiDAR sensor in order to cover it "with respect to the outside" or to protect it against impact, soiling, etc. The cover may also serve aerodynamic and/or design ends. A cover within the meaning of the invention may here be a housing which completely or substantially completely—apart from cable ducts etc.—encompasses the LiDAR sensor. Such a combination of housing and LiDAR sensor likewise forms part of the subject matter of the invention in addition to the superordinate system of the vehicle. It will be appreciated that all embodiments and configurations described as preferable also apply to this combination alone. Likewise the cover may however also be only one element placed in front of the LiDAR sensor in the direction of the vehicle outer skin, preferably as the vehicle outer skin. Such a cover is for example a front panel or a bumper, preferably a front panel. According to the invention a front panel is to be understood as meaning a vehicle body part which as part of the outer shell is attached to the vehicle. This may be a formative constituent of the vehicle front or a design element attached to the front of the vehicle. The cover here is the element traversed by the laser pulses of the LiDAR sensor for detection of the surroundings.

The cover is preferably a moulding employed in the front or rear region of a vehicle, in particular of a motor vehicle, for example a bumper, radiator grille, front panel or a rear panel, in particular a front panel for a motor vehicle, but may likewise be a vehicle side element. The cover may also be only one part of such an element. However, the cover may likewise also be a roof or roof module for a motor vehicle. The cover may equally be a moulding employed in the interior of a vehicle. The system according to the invention may then be used to discern control gestures made by occupants of a vehicle. A "front panel" is to be understood as meaning for example a replacement for a radiator grille. As a result of new forms of mobility, for example electromobility, a radiator grille consisting of a multiplicity of openings is no longer necessary. A front panel is therefore preferably a self-contained front cover or a body part which may comprise only occasional ventilation slots or retains a radiator grille appearance only for design reasons and combines various functions. Such a component part can be integrated seamlessly.

The cover may be mounted not only on motor vehicles but also on other means of transport and means of locomotion, such as drones, aeroplanes, helicopters or rail vehicles, which in accordance with the invention are all subsumed within the term "vehicles". Use in (semi)autonomous machines which are not necessarily used for locomotion, such as robots, harvesters and the like, is also possible.

The distance between the cover and the LiDAR unit is preferably in the range from 1 cm to 20 cm. Larger distances or smaller distances are also possible in principle however. In principle, the LiDAR sensor may be placed directly onto the cover and optionally connected to the cover, by adhesive bonding or by screwing, for example.

The term "system" is understood not only in the narrow sense of a package of mechanically joined individual parts, such as an apparatus, for instance, but also more broadly as a mere combination of individual parts (merely) joined in a functional sense to form a unit. The LiDAR emitter and receiver may be installed into the respective vehicle separately and the cover provided for a desired position in the vehicle through which the pulses of the LiDAR sensor are intended to pass. However, a mechanically joined combination may likewise be concerned.

The LiDAR unit comprises an emitter for laser light having a wavelength of 900 nm to 1600 nm. In accordance with the nature of laser light, this is not to be understood as meaning that the emitter emits light having every wavelength between 900 nm and 1600 nm. On the contrary, it is sufficient when light of one wavelength, for example 905 nm, is emitted. The wavelength which is emitted as light is the so-called operating wavelength. It is also possible to employ a plurality of lasers having different wavelengths in the recited range. It is preferable when the operating wavelength of the laser is in the range from 900 to 980 nm, more preferably up to 950 nm. It is very particularly preferable when the operating wavelength of the laser is 905 nm.

The receiver is typically tuned to a broader spectral window in the wavelength range of 800 nm to 1600 or to a plurality of wavelengths in this range. A broad-spectrum tuning to the recited wavelength range does not mean that the receiver needs to cover the whole range. In contrast to the defined operating wavelength of the LiDAR sensor, i.e. for example the 905 nm of the emitter, the receiver covers a significantly wider range, however, for example 800 to 1000 nm. However, according to the invention it is provided that the receiver at least partially receives light from the range 700 to 900 nm.

The cover comprises a substrate layer or a subregion of a substrate layer made of a thermoplastic composition based on aromatic polycarbonate and/or polymethyl methacrylate. It is preferable when the substrate layer consists of the thermoplastic composition.

"Based on" is to be understood as meaning that the composition of the substrate layer contains the aromatic polycarbonate and/or polymethylmethacrylate as the principal component, preferably in a proportion of at least 70% by weight, preferably at least 80% by weight, more preferably at least 85% by weight, yet more preferably at least 90% by weight, particularly preferably at least 95% by weight, in each case based on the total composition of the substrate layer.

It is particularly preferable when the thermoplastic composition of the substrate layer is based on aromatic polycarbonate. According to the invention "polycarbonate" is to be understood as meaning both homopolycarbonates and copolycarbonates. These polycarbonates may be linear or branched in the familiar manner. It is also possible according to the invention to employ mixtures of polycarbonates, both mixtures of different homopolycarbonates and mixtures of different copolycarbonates and also mixtures of different homo- and copolycarbonates.

In addition to these polymers the thermoplastic composition may also contain blend partners, for example polyestercarbonate, aromatic polyesters such as polyethylene terephthalate (PET), PET cyclohexanedimethanol copolymer (PETG), polyethylene naphthalate (PEN), polybutylene terephthalate (PBT). It is preferable when the thermoplastic composition of the substrate layer contains, however, no further thermoplastic polymer in addition to aromatic polycarbonate and/or polymethyl methacrylate. Further thermoplastic polymer may be present only in amounts such that the permeability to the laser pulses of the LiDAR sensor is not disrupted to an extent such that the system loses its functionality. The substrate layer therefore preferably contains less than 5.0% by weight, more preferably less than 1.0% by weight, of further thermoplastic polymer, and very preferably no further thermoplastic polymer at all. According to the invention "less than" is to be understood as meaning that the respective component may also not be present at all.

Aromatic polycarbonates selected in accordance with the invention preferably have weight-average molecular weights $M_w$ of 22 000 to 29 000 g/mol, although in principle weight-average molecular weights $M_w$ of 10 000 to 50 000 g/mol, more preferably of 14 000 to 40 000 g/mol, very preferably of 16 000 to 32 000 g/mol would also be suitable. The values for $M_w$ here are determined by a gel permeation chromatography, calibrated against bisphenol A polycarbonate standards using dichloromethane as eluent, calibration with linear polycarbonates (made of bisphenol A and phosgene) of known molar mass distribution from PSS Polymer Standards Service GmbH, Germany; calibration according to method 2301-0257502-09D (2009 Edition in German) from Currenta GmbH & Co. OHG, Leverkusen. The eluent is dichloromethane. Column combination of crosslinked styrene-divinylbenzene resins. Diameter of analytical columns: 7.5 mm; length: 300 mm. Particle sizes of column material: 3 μm to 20 μm. Concentration of solutions: 0.2% by weight. Flow rate: 1.0 ml/min, temperature of solutions: 30° C. Detection using a refractive index (RI) detector.

Since the covers may be relatively large and may have a complex geometry for the infrastructure or transport sector, the thermoplastic composition used for the substrate layer should ideally have a sufficient flowability to be able to be processed into corresponding moulded articles in injection moulding processes, for example especially the injection-compression moulding process. The melt volume flow rate MVR is therefore preferably 8 to 20 $cm^3$/(10 min), more preferably 9 to 19 $cm^3$/(10 min), determined according to ISO 1133-1:2011 at 300° C. and a loading of 1.2 kg.

The polycarbonates are preferably produced by the interfacial process or the melt transesterification process, which have been described many times in the literature.

With regard to the interfacial process reference is made for example to H. Schnell, "Chemistry and Physics of Polycarbonates", Polymer Reviews, Vol. 9, Interscience Publishers, New York 1964 p. 33 et seq., to Polymer Reviews, Vol. 10, "Condensation Polymers by Interfacial and Solution Methods", Paul W. Morgan, Interscience Publishers, New York 1965, Chapt. VIII, p. 325, to Dres. U. Grigo, K. Kircher and P. R-Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pp. 118-145 and also to EP 0 517 044 A1.

The melt transesterification process is described, for example, in the "Encyclopedia of Polymer Science", Vol. 10 (1969), Chemistry and Physics of Polycarbonates, Polymer Reviews, H. Schnell, Vol. 9, John Wiley and Sons, Inc. (1964), and in patent specifications DE 10 31 512 A and U.S. Pat. No. 6,228,973 B1.

The polycarbonates are preferably prepared by reactions of bisphenol compounds with carbonic acid compounds, especially phosgene, or of diphenyl carbonate or dimethyl carbonate in the melt transesterification process.

These and further bisphenol/diol compounds that are usable for polycarbonate synthesis are described inter alia in WO 2008/037364 A1 (page 7, line 21 to page 10, line 5), EP 1 582 549 A1 ([0018] to [0034]), WO 2002/026862 A1 (page 2, line 20 to page 5, line 14) and WO 2005/113639 A1 (page 2, line 1 to page 7, line 20).

Examples of dihydroxyaryl compounds suitable for the production of polycarbonates are hydroquinone, resorcinol, dihydroxydiphenyls, bis(hydroxyphenyl)alkanes, bis(hydroxyphenyl)cycloalkanes, bis(hydroxyphenyl) sulfides, bis (hydroxyphenyl) ethers, bis(hydroxyphenyl) ketones, bis (hydroxyphenyl) sulfones, bis(hydroxyphenyl) sulfoxides, α,α'-bis(hydroxyphenyl)diisopropylbenzenes, phthalimidines derived from isatin derivatives or from phenolphthalein derivatives, and the related ring-alkylated, ring-arylated and ring-halogenated compounds.

Preferred dihydroxyaryl compounds are 4,4'-dihydroxydiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 1,1-bis(3,5-dimethyl-4-hydroxyphenyl)-p-diisopropylbenzene and 1,1-bis(4-hydroxyphenyl)-3,3,5-trimethylcyclohexane and also the bisphenols (I) to (III)

(I)

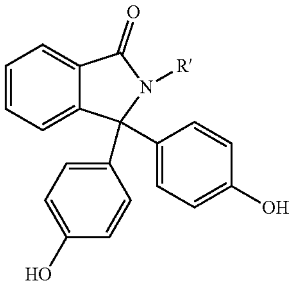

(II)

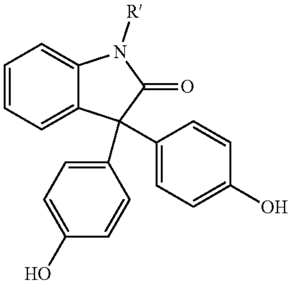

(III)

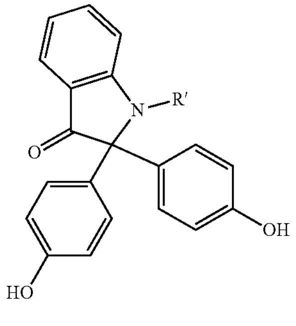

in which R' in each case is $C_1$- to $C_4$-alkyl, aralkyl or aryl, preferably methyl or phenyl, most preferably methyl.

Particularly preferred dihydroxyaryl compounds are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A and also the diphenols of formulae (I), (II) and (III).

Particular preference is given to homopolycarbonates based on bisphenol A and copolycarbonates based on the monomers bisphenol A and 1,1-bis(4-hydroxyphenyl)-3,3,5-trimethylcyclohexane, for example Apec® from Covestro Deutschland AG.

The polycarbonates may be linear or branched. It is also possible to use mixtures of branched and unbranched polycarbonates.

Suitable branching agents for the preparation of branched polycarbonates are known from the literature and described, for example, in the patent documents U.S. Pat. No. 4,185,009 B and DE 25 00 092 A1 (3,3-bis(4-hydroxyaryloxindoles), see whole document in each case), DE 42 40 313 A1 (see page 3, lines 33 to 55), DE 19 943 642 A1 (see page 5, lines 25 to 34) and U.S. Pat. No. 5,367,044 B and literature cited therein.

The polycarbonates used may additionally also be intrinsically branched, in which case no branching agent is added in the course of polycarbonate preparation. An example of intrinsic branching is that of so-called Fries structures, such as are described for melt polycarbonates in EP 1 506 249 A1.

It is also possible to use chain terminators in the production of the polycarbonate. Chain terminators used are preferably phenols such as phenol, alkylphenols such as cresol and 4-tert-butylphenol, chlorophenol, bromophenol or cumylphenol or mixtures thereof.

The thermoplastic composition may further contain customary additives such as flame retardants, antistats, UV absorbers, stabilizers, for example heat stabilizers, mould release agents, flow improvers and antioxidants provided that the LiDAR signal is not disrupted to a relevant extent. Suitable ultraviolet absorbers are benzotriazoles, triazines, benzophenones and/or arylated cyanoacrylates. Preferred stabilizers include phosphites and phosphonites and also phosphines. It is also possible to employ alkyl phosphates, for example mono-, di- and trihexyl phosphate, triisooctyl phosphate and trinonyl phosphate. However, it is preferable when the thermoplastic compositions used according to the invention for the substrate layer in the sensor systems are free from phosphorus-based stabilizers. Employable antioxidants include phenolic antioxidants such as alkylated monophenols, alkylated thioalkylphenols, hydroquinones and alkylated hydroquinones.

The thermoplastic composition preferably contains less than 0.1% by weight of, and very particularly preferably the compositions of the substrate layer are free from, scattering additives, for example those based on acrylate, polyethylene, polypropylene, polystyrene, glass, aluminium oxide and/or silicon dioxide. Furthermore, the composition particularly preferably contains less than 0.1% by weight of, and very particularly preferably is free from, white pigments or similar pigments such as, for example, titanium dioxide, kaolin, barium sulfate, zinc sulfide, aluminium oxide, aluminium hydroxide, quartz flour, from interference pigments and/or pearlescent pigments, i.e. platelet-shaped particles such as mica, graphite, talc, $SiO_2$, chalk and/or titanium dioxide, coated and/or uncoated.

Furthermore, the thermoplastic composition preferably contains in total less than 0.1% by weight of, and very particularly preferably the composition is free from, nanoparticulate systems such as metal particles and/or metal oxide particles. The composition preferably also contains less than 0.1% by weight of, and particularly preferably is free from, pigments based on insoluble pigments, such as are described for example in DE 10057165 A1 and in WO 2007/135032 A2.

The composition is preferably free from infrared absorbers, i.e. from components not recited above as inventive. This is related to the attenuation of the LiDAR signal by infrared absorbers in the polymer. Infrared absorbers are in particular carbon black or $LaB_6$.

In addition to the substrate layer the cover may further comprise one or more further layers. Such layers are for example one or more topcoat layers on the visible side and/or the opposite side of the substrate layer and optionally additional primer layers. It is preferable when the cover comprises no further layers other than the substrate layer, one or more topcoat layers and any primer layers optionally present.

What is described hereinabove in relation to constituents which are preferably to be omitted or employed only in low concentrations applies not only to the thermoplastic composition of the substrate layer but also to all further layers of the cover that may optionally be present.

The cover preferably attenuates the LiDAR signal only to the extent that the signal intensity of IR light emitted by the LiDAR unit and received thereby determined by reflection from a smooth surface painted with $TiO_2$-containing white paint at a distance of 3.2 m is ≥65%, more preferably ≥70%, of a reference intensity determined without the cover.

However, it is preferable when the cover has at least one topcoat layer. This may be used to improve scratch and weathering resistance. Coating systems particularly suitable therefor and used for example for polycarbonate sheets in the construction sector, for headlight covers made of polycarbonate or else in the field of polycarbonate automotive glazing may be roughly divided into three categories:

(a) thermosetting coating systems based on a polysiloxane coating which may be either single-layer or multilayer systems (with a merely adhesion-promoting primer layer between the substrate and the polysiloxane topcoat). These are described inter alia in U.S. Pat. Nos. 4,278,804 A, 4,373,061 A, 4,410,594 A, 5,041,313 A and EP0 087 001 A1. One variant is the use of the adhesive primer necessary for the siloxane-based topcoat as a UV protection primer when said primer is mixed with a UV absorber and applied in a higher layer thickness.

(b) thermally curable multilayer systems comprising a UV protection primer and a topcoat based on a polysiloxane coating. Suitable systems are known for example from U.S. Pat. Nos. 5,391,795 A and 5,679,820 A.

(c) UV-curable coating systems, based on acrylate, urethane acrylate or acryloylsilane for example and optionally including fillers for improving scratch resistance, may likewise provide sufficient protection from weathering on account of their relatively broad application layer thickness window. Such systems are known and are described inter alia in U.S. Pat. No. 3,707,397 A or DE 69 71 7959 T2, U.S. Pat. Nos. 5,990,188 A, 5,817,715 A, 5,712,325 A and WO 2014/100300 A1.

If an adhesion promoter layer (primer layer) is present between the topcoat layer and the substrate layer said layer is preferably a combination of an adhesion promoting UV protection primer based on polymethyl methacrylate comprising dibenzoyl resorcinol as a UV absorber and a polysiloxane topcoat comprising a silylated UV absorber. Both layers, i.e. the primer layer and the topcoat layer together, assume the UV protection function.

The cover may further include inter alia the following layers: an anti-reflection layer, an anti-condensation layer, an anti-dust layer, a layer improving media resistance, a layer improving scratch resistance or a combination thereof. Examples of anti-condensation and anti-dust coatings are layers obtained by flame silicatization. Anti-reflection layers include all single-ply or multi-ply layer constructions having as their outer layer a layer of low refractive index (nD<1.5). The use of the exteriorly employed coating may also improve inter alia the following properties: media-resistance, scratch resistance, reflection reduction (antireflection) and mild anti-dust effect.

The substrate layer of the covers described according to the invention in the region of the described thermoplastic compositions, preferably in the entire region of the substrate layer, preferably has a thickness of 1.0 to 7.0 mm, more preferably 1.6 to 6.0 mm, particularly preferably a thickness of 2.0 to 4.0 mm. The reported thicknesses relate to the average thickness over the entire area of the substrate layer. Since any topcoat layer optionally present has a thickness in the μm range, and the same is true of any primer layer optionally present, the overall thickness of the cover preferably does not deviate substantially from these values and these values may therefore apply equally to the total thickness of the cover.

EXAMPLES

Components

PC-1: Linear bisphenol A homopolycarbonate comprising end groups based on phenol having a melt volume rate MVR of 12 $cm^3$/10 min (measured at 300° C. and a loading of 1.2 kg according to ISO 1133-1:2011) and containing as colorants of group a 0.031% by weight of Oracet Yellow 180, 0.12% by weight of Macrolex Violet B and 0.067% by weight of Macrolex Green 5B, further additives: 0.30% by weight of pentaerythritol tetrastearate and 0.05% by weight of Irganox B900.

PC-2: Linear bisphenol A homopolycarbonate comprising end groups based on phenol having a melt volume rate MVR of 6 $cm^3$/10 min (measured at 300° C. and a loading of 1.2 kg according to ISO 1133-1:2011).

PC-3: Linear bisphenol A homopolycarbonate comprising end groups based on phenol having a melt volume rate MVR of 18 $cm^3$/10 min (measured at 300° C. and a loading of 1.2 kg according to ISO 1133-1:2011) and containing as colorants from group a 0.005% by weight of Macrolex Yellow 3G, 0.06% by weight of Macrolex Red EG and 0.019% by weight of Amaplast Blue HB and as colorant from group b 0.032% by weight of colorant A (colorant of formula (4)), further additives: 0.04% by weight of pentaerythritol tetrastearate.

PC-4: Luminate 7276. Polycarbonates from Epolin containing two or more colorants of group a including Macrolex Violet B and Macrolex Orange R in a total concentration in the inventive range and two colorants of group b (colorants of formula (5) having an absorption maximum of 700 to 750 nm and Macrolex Green G (formula (4)) in individual concentrations and the total concentration in the inventive range)

PC-5: Linear bisphenol A hompolyocarbonate comprising end groups based on phenol having a melt volume rate MVR of 12 $cm^3$/10 min (measured at 300° C. and a loading of 1.2 kg according to ISO 1133-1:2011) and containing as colorants of group a 0.1% by weight of Macrolex Yellow 6G, 0.1% by weight of Macrolex Violet B, 0.0001% by weight of Macrolex Violet 3R and 0.00006% by weight of Macrolex Blue RR and as colorant of group b 0.03% by weight of colorant of formula (2).

Colorants of Group b:

Colorants of group b are already present in the PC mixtures PC-3, PC-4 and PC-5.

Macrolex Green G: Solvent Green 28; CAS 4851-50-7 from Lanxess AG, Leverkusen (colorant of formula (4)); (absorption maximum approximately in the range 670-700 nm).

Paliogen Blue L6385: BASF SE, Ludwigshafen; colorant of formula (1), (referred to in the table only as Paliogen Blue) (absorption maximum approximately in the range of 660 to 770 nm).

Lumogen IR 765: BASF SE, Ludwigshafen; colorant of structure (2); absorption maximum approximately in the range 660-800 nm).

Colorant for comparative example: Heliogen Blue K7104. Phthalocyanine dye. Absorption maximum in the range of 670 to 680 nm (referred to in the table only as Heliogen Blue).

Compounding

The compounding of the materials was carried out in a KraussMaffei Berstorff ZE25 twin-screw extruder at a barrel temperature of 260° C., or a mass temperature of approximately 280° C. and a speed of 100 rpm. Unless otherwise stated the additives were mixed together with pulverulent polycarbonate PC-2 in the specified amounts and then compounded together with the polycarbonate PC-1.

Sample Preparation

The optical rectangle sheets having dimensions of 250 mm×105 mm×3.2 mm were manufactured on an Arburg 720S Allrounder injection moulding machine.

The mass temperature was between 280° C. and 290° C. and the mould temperature was 80° C.

The sheets were then flow-coated on both sides with the primer system SHP 470 FT 2050 from Momentive Performance Materials GmbH and with the topcoat AS4700 (silicone scratch-resistant coating).

Example 1 (Comparative Example)

PC-1 and PC-2 were compounded with one another as described above. This polycarbonate mixture contains no colorants of group b. The results for LiDAR signal strength, light transmission and hiding power are summarized in the table.

Example 2 (According to the Invention)

The mixing of polycarbonates PC-1 and PC-2 was performed as described in example 1. In a departure from example 1 the powder component PC-2 was admixed with 0.05% by weight of Macrolex Green G (colorant of group b; formula (4)). The results for LiDAR signal strength, light transmission and hiding power are summarized in the table.

Example 3 (According to the Invention)

The mixing of polycarbonates PC-1 and PC-2 was performed as described in example 1. In a departure from example 1 the powder component PC-2 was admixed with 0.01% by weight of Paliogen Blue (colorant of group b; formula (1)). The results for LiDAR signal strength, light transmission and hiding power are summarized in the table.

Example 4 (Comparative Example)

The mixing of polycarbonates PC-1 and PC-2 was performed as described in example 1. In a departure from example 1 the powder component PC-2 was admixed with 0.1% by weight of Paliogen Blue (colorant of group b; formula (1)). The results for LiDAR signal strength, light transmission and hiding power are summarized in the table.

Example 5 (According to the Invention)

The mixing of polycarbonates PC-1 and PC-2 was performed as described in example 1. In a departure from example 1 the powder component PC-2 was admixed with 0.005% by weight of Lumogen IR765 (colorant of group b; structure 2). The results for LiDAR signal strength, light transmission and hiding power are summarized in the table.

Example 6 (According to the Invention)

A polycarbonate sheet containing the colorants from PC-4 was analyzed. This sheet was obtained directly from the manufacturer. The results for LiDAR signal strength, light transmission and hiding power are summarized in the table.

Example 7 (Comparative Example)

This example employed the polycarbonate mixture PC-3 which in a departure from example 1 contained the colorants from group a 0.005% by weight of Macrolex Yellow 3G, 0.06% by weight of Macrolex Red EG and 0.019% by weight of Amaplast Blue HB and from group b 0.032% by weight of the colorant Macrolex Green G (formula (4)). The results for LiDAR signal strength, light transmission and hiding power are summarized in the table.

Example 8 (According to the Invention)

The mixing of polycarbonates PC-1 and PC-2 was performed as described in example 1. In a departure from example 1 the powder component PC-2 was admixed with 0.20% by weight of Macrolex Green G (colorant of group b; formula (4)). The results for LiDAR signal strength, light transmission and hiding power are summarized in the table.

Example 9 (Comparative Example)

The mixing of polycarbonates PC-1 and PC-2 was performed as described in example 1. In a departure from example 1 the powder component PC-2 was admixed with 0.05% by weight of Heliogen Blue (absorption maximum at approximately 670 to 680 nm). The results for LiDAR signal strength, light transmission and hiding power are summarized in the table.

Example 10 (Comparative Example)

This example employed the polycarbonate mixture PC-3 which in a departure from example 1 contained the colorants from group a 0.1% by weight of Macrolex Yellow 6G, 0.1% by weight of Macrolex Violet B, 0.0001% by weight of Macrolex Violet 3R and 0.00006% by weight of Macrolex Blue RR and as colorant from group b 0.03% by weight of Lumogen IR 765 (colorant of formula (2)) The results for LiDAR signal strength, light transmission and hiding power are summarized in the table.

Measurement of LiDAR Signal Strength

To reduce the scattered-light signals, the sensor head of the LiDAR sensor was shielded on the side away from the measurement path. Only lasers 1, 3, 5, 7, 8, 10, 12 and 14 were used. Furthermore, the field of view (FOV) of the sensor in the sensor interface was limited to 20° (350°-10°). The reflection surface used was a smooth white surface coated with $TiO_2$-containing paint. The wall was at a distance of 3.2 m from the LiDAR sensor.

The test specimens were tested using a sample holder parallel to the LiDAR, wherein the back side of the sample was arranged about 10 mm in front of the LiDAR sensor so that both the output signal and the reflected input signal had to pass through the wall thickness of the test sheet. Analysis was carried out using the "VeloView" software from the manufacturer of the LiDAR sensor, Velodyne. The average value of the intensities measured for a sample was determined. This average sample value was divided by the average value of the reference measurement (air) to determine the relative intensity.

The lower the attenuation (weakening) of the signal, i.e. the higher the intensity of the signal measured, the more suitable the cover for LiDAR-assisted sensor applications in the automotive sector. The intensities measured in the examples are documented in the column "LiDAR signal strength".

Values of ≥65% are considered sufficient intensities.

Visual Assessment of Hiding Power (Opacity) with Respect to LED Light:

Hiding power was determined by visual assessment of the samples using a white LED having a colour temperature of 4600 K and an irradiation intensity of 180 $mW/cm^2$ (on the sample).

Light transmission: Ty (D65, 10°), determined according to DIN EN ISO 13468-2:2006 attenuation of the LED light despite the use of a colorant whose absorption maximum is between 650 and 700 nm. Example 9 also employed a colorant that exhibits an absorption maximum in the range from >650 nm bis 800 nm and shows practically no absorption above 750 nm but significantly attenuates the LiDAR signal. It could thus be demonstrated that not all colorants having their absorption maximum in the range from >650 nm to 800 nm were able to achieve the desired "cutoff characteristics" coupled with low attenuation of the LiDAR signal. It is apparent that only the compositions according to the invention allow a high residual signal strength and achieve the required covering of the LED light.

The invention claimed is:

1. A sensor system comprising a LiDAR unit having an emitter for laser IR light having an operating wavelength of 900 nm to 1600 nm and a receiver for laser light over a wavelength range which is between 800 nm and 1600 nm and is at least partially below the operating wavelength of the LiDAR sensor and a cover having a substrate layer comprising a region made of a thermoplastic composition based on aromatic polycarbonate and/or polymethyl methacrylate which is arranged such that the IR light emitted by the LiDAR emitter and received by the LiDAR receiver passes through the region made of the thermoplastic composition,

TABLE 1

Compositions and results

| | 1V | 2E | 3E | 4V | 5E | 6E | 7V | 8E | 9V | 10V |
|---|---|---|---|---|---|---|---|---|---|---|
| Composition [% by wt.] | | | | | | | | | | |
| PC-1 | 95.0 | 95.0 | 95.0 | 95.0 | 95.0 | | | 95.0 | 95.0 | |
| PC-2 | 5.0 | 4.95 | 4.99 | 4.90 | 4.995 | | | 4.80 | 4.95 | |
| PC-3 | | | | | | | 100 | | | |
| PC-4 | | | | | | 100 | | | | |
| PC-5 | | | | | | | | | | 100 |
| Macrolex Green G | | 0.05 | | | | | | 0.20 | | |
| Paliogen Blue | | | 0.01 | 0.10 | | | | | | |
| Lumogen IR 765 | | | | | 0.005 | | | | | |
| Heliogen Blue | | | | | | | | | 0.05 | |
| Results | | | | | | | | | | |
| Thickness [mm] | 3.2 | 3.2 | 3.2 | 3.2 | 3.2 | 2.5 | 3.2 | 3.2 | 3.2 | 3.2 |
| LiDAR signal strength [%] | 76 | 76 | 71 | 7 | 76 | 66 | 68 | 70 | 21 | 61 |
| Ty | 0.02 | 0.01 | 0.01 | 0.01 | 0.01 | 0.01 | 0.0 | 0.0 | 0.0 | 0.0 |
| LED light | + | 0 | – | 0 | – | 0 | + | 0 | – | – |

+: LED visible;
–: LED weakly visible;
0: LED invisible

Example 1 shows that without colorants of the claimed group b the desired "cutoff" in spectrum is not achievable—the LED, as used in automotive headlights, is thus clearly visible and would thus likewise be captured by the LiDAR Sensor. Examples 2, 3, 5 and 6 contain colorants from the group b and thus exhibit the desired "cutoff characteristics". Despite the use of colorants absorbent at longer wavelengths the attenuation of the LiDAR signal remains low. Example 4 shows that concentrations of colorants from group b which are outside the inventive concentration range, presently an excessively high concentration, result in a surprisingly severe increase in attenuation of the LiDAR signal. This also applies to example 10. Example 7 does not show the desired wherein the thermoplastic composition has a light transmission Ty (D65, 10°) determined according to DIN EN ISO 13468-2:2006 at a layer thickness of 4 mm of <0.5%, wherein the thermoplastic composition contains a) at least two colorants having an absorption maximum in the range from 400 nm to 650 nm selected from the group consisting of anthraquinone and perinone dyes in a total concentration of 0.07% by weight to 0.5% by weight, and b) at least one colorant having an absorption maximum in the range from >650 nm to 800 nm selected from the group consisting of the colorants of formulae (1) to (5) with (1)

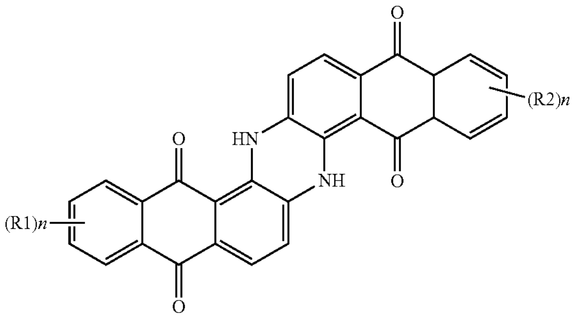

in a concentration of 0.008% to 0.02% by weight, wherein

R1 and R2 independently of one another represent a linear or branched alkyl radical or halogen, n is a natural number between 0 and 4, (2)

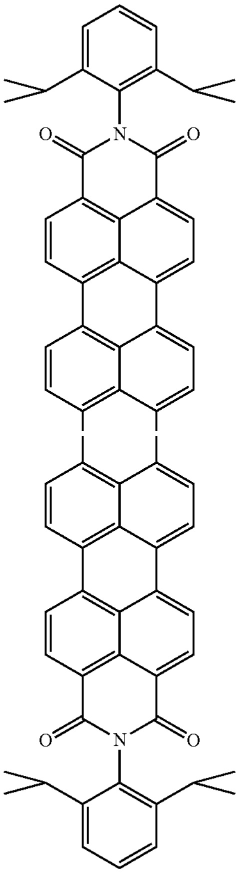

in a concentration of 0.002% to 0.008% by weight, (3)

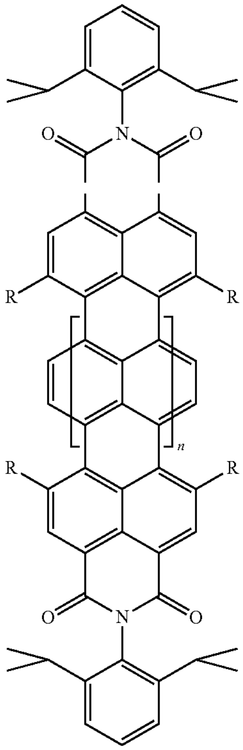

where

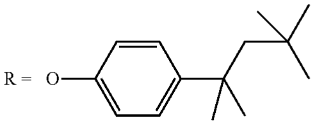

and n is from 1 to 3, in a concentration of 0.002% to 0.008% by weight, wherein the total concentration of colorants of formulae (2) and (3) is up to 0.008% by weight, (4)

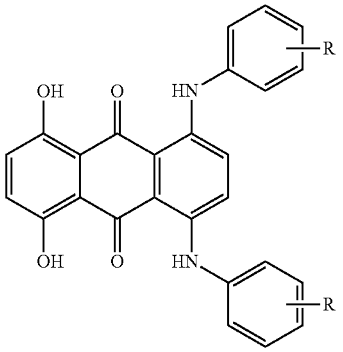

in a concentration of 0.04% to 0.3% by weight where R=n-butyl, iso-butyl, (5)

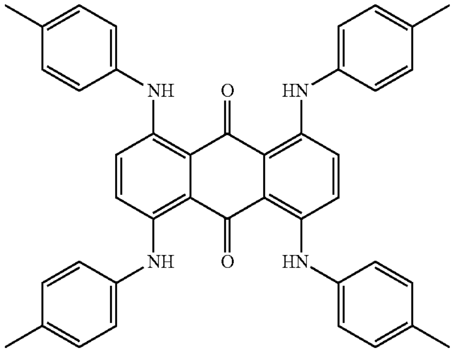

in a concentration of 0.04% to 0.3% by weight, in a total concentration of 0.005% to 0.3% by weight wherein the composition contains <0.05% by weight of phthalocyanines, wherein the cover comprises no further layers other than the substrate layer, one or more primer layers optionally present and one or more topcoat layers optionally present, wherein the primer layer is based on polymethylmethacrylate and optionally contains a UV absorber and the topcoat layer is based on polysiloxane comprising a combination of an organo-modified silane with a silica sol, and wherein the topcoat layer contains silicon dioxide particles having a D90 determined by scanning transmission electron microscopy of less than 0.50 μm and no further particles having a D90 determined by scanning transmission electron microscopy ≥0.50 μm.

2. The sensor system according to according to claim 1, wherein the thermoplastic composition of the substrate layer contains further thermoplastic polymers, colorants distinct from colorants of groups a and b, heat stabilizers, demoulding agents, UV absorbers, carbon black, flame retardants, antistats and/or flow improvers.

3. The sensor system according to claim 1, wherein the composition contains no further thermoplastic polymers.

4. The sensor system according to claim 1, wherein the composition of the substrate layer is free from phthalocyanines.

5. The sensor system according to claim 1, wherein the LiDAR unit has an emitter for laser light having an operating wavelength of 900 nm to 950 nm.

6. The sensor system according to claim 1, wherein the operating wavelength of the laser lights emitter of the LiDAR unit is 905 nm±5 nm.

7. A sensor system comprising:

a LiDAR unit having an emitter for laser IR light having an operating wavelength of 900 nm to 1600 nm and a receiver for laser light over a wavelength range which is between 800 nm and 1600 nm and is at least partially below the operating wavelength of the LiDAR sensor and a cover having a substrate layer comprising a region made of a thermoplastic composition based on aromatic polycarbonate and/or polymethyl methacrylate which is arranged such that the IR light emitted by the LiDAR emitter and received by the LiDAR receiver passes through the region made of the thermoplastic composition, wherein the thermoplastic composition has a light transmission Ty (D65, 10°) determined according to DIN EN ISO 13468-2:2006 at a layer thickness of 4 mm of <0.5%, wherein the thermoplastic composition contains a) at least two colorants having an absorption maximum in the range from 400 nm to 650 nm selected from the group consisting of anthraquinone and perinone dyes in a total concentration of 0.07% by weight to 0.5% by weight, and b) at least one colorant having an absorption maximum in the range from >650 nm to 800 nm selected from the group consisting of the colorants of formulae (1) to (5) with (1)

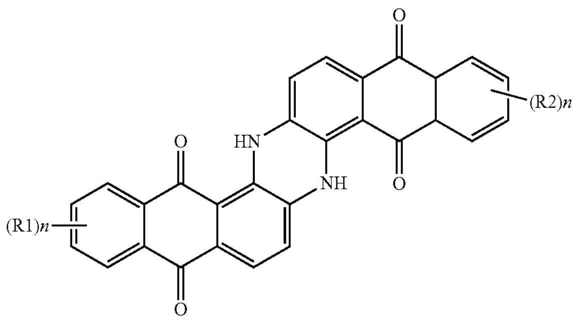

in a concentration of 0.008% to 0.02% by weight, wherein

R1 and R2 independently of one another represent a linear or branched alkyl radical or halogen, n is a natural number between 0 and 4, (2)

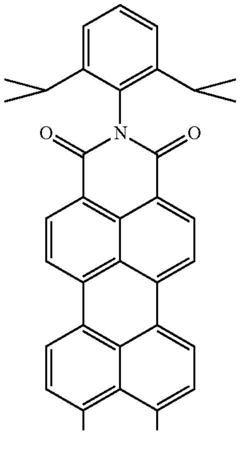

-continued

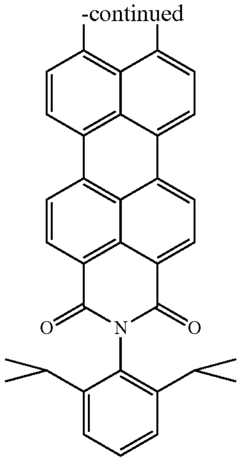

in a concentration of 0.002% to 0.008% by weight, (3)

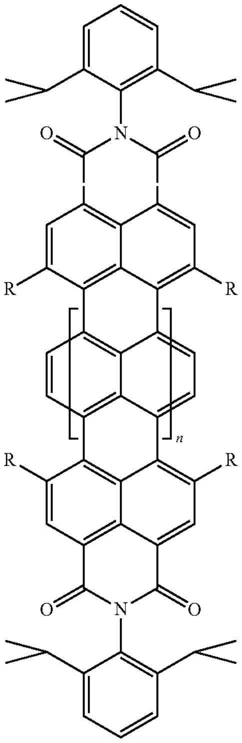

where

R =

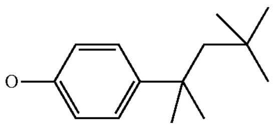

and n is from 1 to 3, in a concentration of 0.002% to 0.008% by weight, wherein the total concentration of colorants of formulae (2) and (3) is up to 0.008% by weight, (4)

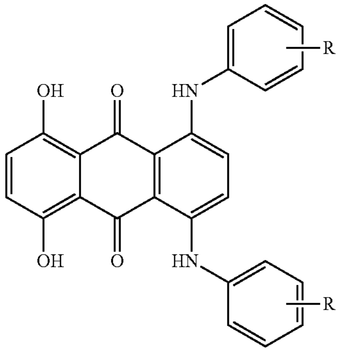

in a concentration of 0.04% to 0.3% by weight where R=n-butyl, iso-butyl, (5)

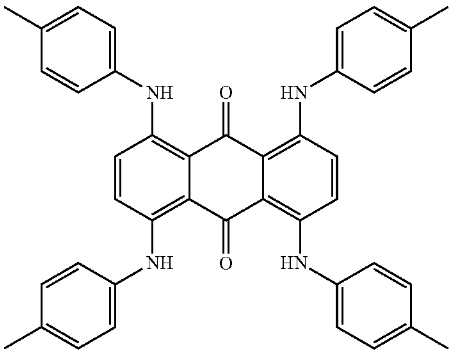

in a concentration of 0.04% to 0.3% by weight, in a total concentration of 0.005% to 0.3% by weight wherein the composition contains <0.05% by weight of phthalocyanines, and, wherein the cover attenuates the LiDAR signal only to the extent that the signal intensity of IR light emitted by the LiDAR unit and received thereby determined by reflection from a smooth surface painted with $TiO_2$-containing white paint at a distance of 3.2 m is ≥65% of a reference intensity determined without the cover.

8. The sensor system according to claim 1, wherein the cover is a front panel, a rear panel, a bumper, a radiator grille, a vehicle roof, a vehicle roof module, a vehicle side part or an element of the aforementioned.

9. The sensor system according to claim 1, wherein the colorants of group a are selected so as to give a black colour impression.

10. The sensor system according to claim 1, wherein only one colorant of formula (2) is present as colorant of group b.

11. The sensor system according to claim 1, wherein only one colorant of formula (4) is present as colorant of group b.

12. The sensor system according to claim 1, wherein the thickness of the substrate layer is 1.0 to 7.0 mm.

13. The sensor system according to claim 1, wherein the CIELab color coordinates of the composition of the substrate layer determined at a thickness of 2 mm according to ISO 13468-2:2006 (D65, 10°) and measured in transmission are as follows: L* less than 40, a* less than 10 and more than −10 and b* less than 10 and more than −10.

* * * * *